Oct. 13, 1931.   E. S. BRISTOL   1,827,417
CONTROL SYSTEM
Original Filed Nov. 19, 1927   2 Sheets-Sheet 1

INVENTOR.
Edward S. Bristol
BY
Cornelius D. Ehret
HIS ATTORNEY.

Oct. 13, 1931.   E. S. BRISTOL   1,827,417
CONTROL SYSTEM
Original Filed Nov. 19, 1927   2 Sheets-Sheet 2

INVENTOR.
Edward S. Bristol
BY
Cornelius L. E Lret
HIS ATTORNEY.

Patented Oct. 13, 1931

1,827,417

UNITED STATES PATENT OFFICE

EDWARD S. BRISTOL, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA

CONTROL SYSTEM

Application filed November 19, 1927, Serial No. 234,410. Renewed March 7, 1931.

My invention relates to apparatus for effecting a control, or a plurality of independent or interdependent or co-ordinated controls, in response to variations in magnitude of a condition or conditions, as chemical, physical, electrical and other condition or conditions.

In accordance with my invention, the magnitude of an electric control current is varied in response to variations in magnitude of a condition, as fluid pressure or rate of flow of fluid, to effect the control or extent of operation of one or more apparatus for controlling by any suitable apparatus corresponding changes in magnitude of a condition, rate of flow of fluid, rate of delivery of material, as fuel, etc., with or without effect in the magnitude of the condition, rate of flow of fluid, etc., which effects a change in magnitude of the control current.

In accordance with my invention, there is provided mechanism for automatically varying the magnitude of an electric control current in response to changes in pressure of a fluid, representative of a change of a condition as for example, rate of flow of fluid, in combination with means for automatically superimposing upon the automatic current-varying means a control responsive directly to movement of a member of the control mechanism movable in response to pressure change, for the purpose of effecting return of pressure to a predetermined standard at a desired rate.

In accordance with one of the features of my invention, the combustion in the furnace of a steam boiler or generator may be controlled so as to vary the over-fire suction in response to the conjoint action of forces representative, respectively, of change in steam pressure and difference between the over-fire pressure and some other pressure, preferably atmospheric pressure.

Further in accordance with my invention, I provide a control balance equipped with Kelvin balance coils, or equivalent, traversed by the control current and provided with means for adjusting or changing the force-electric current relation or constant.

In some of its aspects my present invention involves features of the character disclosed in my United States Patent No. 1,542,300 granted June 16, 1925 and this application is a continuation in part of application Serial No. 634,311 filed April 24, 1923.

My invention resides in apparatus of the character hereinafter described and claimed.

For an illustration of some of the forms my invention may take, reference may be had to the accompanying drawings in which.

Figure 1:
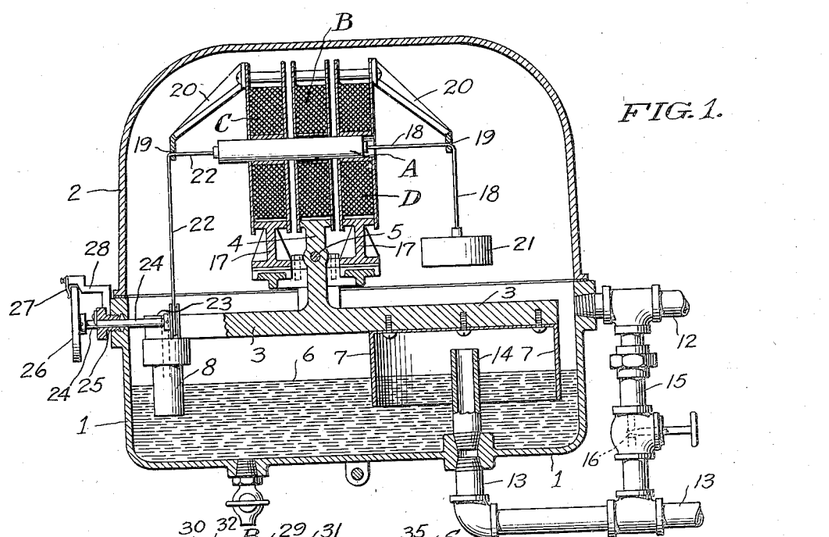
Fig. 1 is a sectional view, parts in elevation, of a control balance embodying features of my invention.
Figure 2:
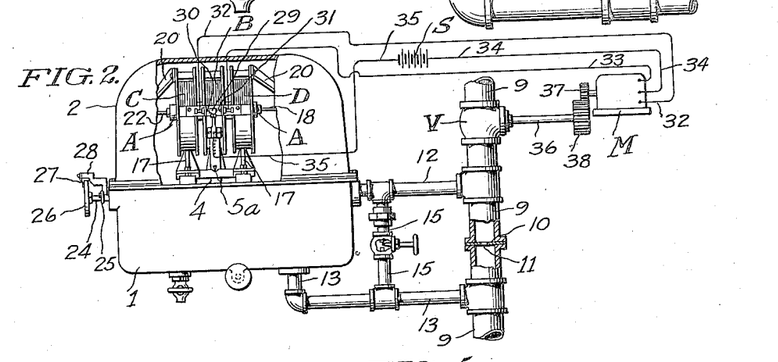
Fig. 2 is an elevational view, partly in section, and partly in diagram, of a control balance of the character indicated in Fig. 1 responsive to and controlling the rate of flow of a fluid.

Referring to Figs. 1 and 2, a receptacle 1 with the member 2 forms a sealed or pressure-tight chamber within which is disposed the arm or beam 3 having the upstanding arm 4 secured upon a shaft 5 carrying at its opposite ends knife edges 5a resting upon fixed abutments, whereby the members 3 and 4 are delicately and nicely pivoted for movement about an axis which, in the example illustrated, is horizontal.

Disposed in the vessel 1 is a body of any suitable liquid, as oil, rising to a suitable level, for example, that indicated at 6.

Attached to the beam 3 is a bell or open-ended chamber 7, whose mouth or open end is disposed below the level 6 of the liquid. Secured to the beam 3 is the member 8, projecting into the liquid, and compensating for changes in height of liquid level 6. Adjustment of normal position of beam 3 may be effected by a weight (not shown) adjustable longitudinally of the beam.

Through a pipe 9, Fig. 2, flows a fluid, such as air, gas, etc., in response to changes in whose rate of flow there is exerted upon the beam 3 a varying force. This force, in the example illustrated, is a differential pressure, the resultant of the difference in pressures on opposite sides of the plate 10 having the orifice 11, within the pipe 9. From one side of the orifice 11 connection is made through the pipe 12 to the interior of the chamber above the liquid level 6; and from the other side of the orifice 11 connection is made through the pipe 13 and the pipe 14 to the interior of the bell 7 above the liquid level 6, the pipe 14 preferably being separate from the pipe 13 and threaded to the receptacle 1, as indicated in Fig. 1.

The difference between the pressures inside and outside of the bell 7, as effected by the connections 12 and 13, may be adjusted or varied, for a given rate of flow of fluid through the pipe 9, by recourse to the bleeder pipe 15 connecting the pipes 12 and 13 and controlled by any suitable throttling means, as a needle valve 16.

Secured upon the upper end of the arm 4 is a magnet coil B, disposed between the stationary coils C and D carried upon the stationary supports 17, suitably carried and supported within the chamber.

Common to two or more of the coils is the iron or other core A, having attached to one end thereof a cord 18, or equivalent, passing through the eye 19 in a bracket 20, and having attached to its other end the weight 21.

Attached to the other end of the core A is a core 22, or equivalent, passing through an eye 19 in a second bracket 20. The cord 22 is wrapped around and has its end secured to the spool or drum 23 secured upon the rotatable shaft 24, extending through the pressure tight stuffing box or gland 25 to the exterior of the chamber, where there is secured thereon the disk or wheel 26, which may be suitably marked or indexed with graduations, with which co-acts the combined index or pointer and disk-clamping member 27 carried by the bracket 28 secured to the chamber.

As indicated in Fig. 2, there is carried by the movable arm 4 a contact 29 co-acting with the laterally adjustable stationary contacts 30 and 31. The fixed and movable contacts are utilized for controlling any suitable electric circuit for effecting any desired or suitable result, as a control.

As illustrated in Fig. 2, the stationary contacts 30 and 31 are connected by conductors 32 and 33, respectively, with the external terminals of two series field windings of a reversible electric motor M, the other terminals of the series field windings being connected to the same terminal of the armature of the motor, whose other terminal connects by conductor 34 to one terminal of a source of current S, whose other terminal connects by conductor 35 with the movable contact 29. The contacts 29, 30, 31 may control relays which in turn control the motor M.

The translating device or motor M may be utilized to effect any suitable or desirable operation or control. In the example illustrated, the motor M rotates the stem 36 of a valve V which controls the rate of flow of fluid through the pipe 9. As generically indicated by the pinion 37 and gear 38, there is provided between the armature shaft of the motor M and the driven member, as valve stem 36, reduction gearing, whereby the motor armature may make several or many revolutions for one revolution of the stem 36, for effecting nicety of control and for introducing a time lag of suitable magnitude, if desired.

When the rate of flow of fluid through the pipe 9 is too great, the difference between the pressures within and without the bell 7 is of a magnitude sufficient to overcome the magnetic force exerted by the coil B upon the stationary coil or coils C, D, all of which are connected in series with each other and traversed by a control current, with the result that the arm 4 is tilted to close the circuit from the source S through one of the field windings and the armature of the motor M, causing rotation of the valve stem 36 in such direction as to reduce the rate of flow which, upon attaining the desired magnitude, causes such a force to be exerted upon the beam 3 that the contact 29 resumes its mid or neutral position indicated in Fig. 2, opening the circuit of the motor M. Similarly, when the rate of flow falls below the desired magnitude, the beam 3 is tilted in the opposite direction, closing the circuit through the other series field winding and armature of the motor M, causing the armature to rotate in the opposite direction from that of the preceding case, and rotating the stem 36 to open the valve V, and the resultant increase of rate of flow causes the force exerted by the differential pressure upon the beam 3 to increase and overcome the force exerted by the control coils until the contact 29 again resumes its mid or neutral position when the circuit of the motor M is opened.

To vary or adjust the magnitude of the magnetic force as exerted between the fixed and movable coils, for a given magnitude of the control current flowing therethrough, and thereby vary the relation between the magnitude of control current and the differential pressure exerted upon the beam 3 for a given magnitude of flow of fluid through the pipe 9, the disk 26 is turned in suitable direction to effect movement of the core A to the right or the left, with the result that for a given magnitude of current through the fixed and movable coils the amount of force exerted between them is adjusted or varied to suitable magnitude. Accordingly, by varying the position of the core A there is varied the effect of a control current of a predetermined magnitude upon the range or amount of control effected by the circuit controlled by the fixed and movable contacts.

Or without changing the position of the core A, a change in the opening of the needle valve 16 changes the force exerted upon the beam 3 in response to a predetermined rate of flow of fluid through the pipe 9.

It will be understood that either the core A alone may be shifted in position, or the valve 16 alone may be adjusted, or both may be adjusted to affect the relation between the rate of flow of fluid and the magnitude of the control current. Variation of position of the core A varies the constant of the instrument or the relation between the magnitude of the electric current and the force effected thereby by means of the fixed and movable coils. Variation of the position of the valve 16 varies the force exerted upon the movable structure, as the beam 3, and the rate of flow of fluid, by varying the difference in pressures effectively applied to the control balance.

By the utilization of a movable coil B, with one or more fixed coils, C, D, the force exerted as between the movable coil and the fixed coil or coils is proportional to the square of the magnitude of the current traversing the coils, and the force exerted upon the balance arm or beam 3 is proportional to the square of the rate of flow of fluid through the pipe 9, and accordingly the rate of flow of fluid is proportional to the magnitude of the control current.

As a substitute for two or more coils acting upon each other, as in the case of the aforesaid movable and fixed coils B, C, D, there may be utilized a fixed (or movable) coil structure traversed by the control current and co-acting with a movable (or fixed) soft iron core, in which case again the force exerted upon the balance arm is proportional to the square of the control current. With this arrangement, the relation of the force exerted with respect to the magnitude of the control current may be adjusted or varied by adjusting the relative normal positions of the fixed and movable elements.

In lieu of a movable coil B with one or more fixed coils C and D, as described, there may be utilized, when suitable or desirable, one or more coils traversed by the control current and co-acting with a permanently polarized member, or members, as a permanent magnet or separately excited electromagnet, in which case the force exerted upon the balance arm is directly proportional to the magnitude of the control current. With this arrangement, the relation of the force exerted with respect to the magnitude of the control current may be adjusted or varied by adjusting the relative normal positions of the fixed and movable elements, or by varying the magnitude of the current which excites the electro-magnet.

Figures 3, 4:
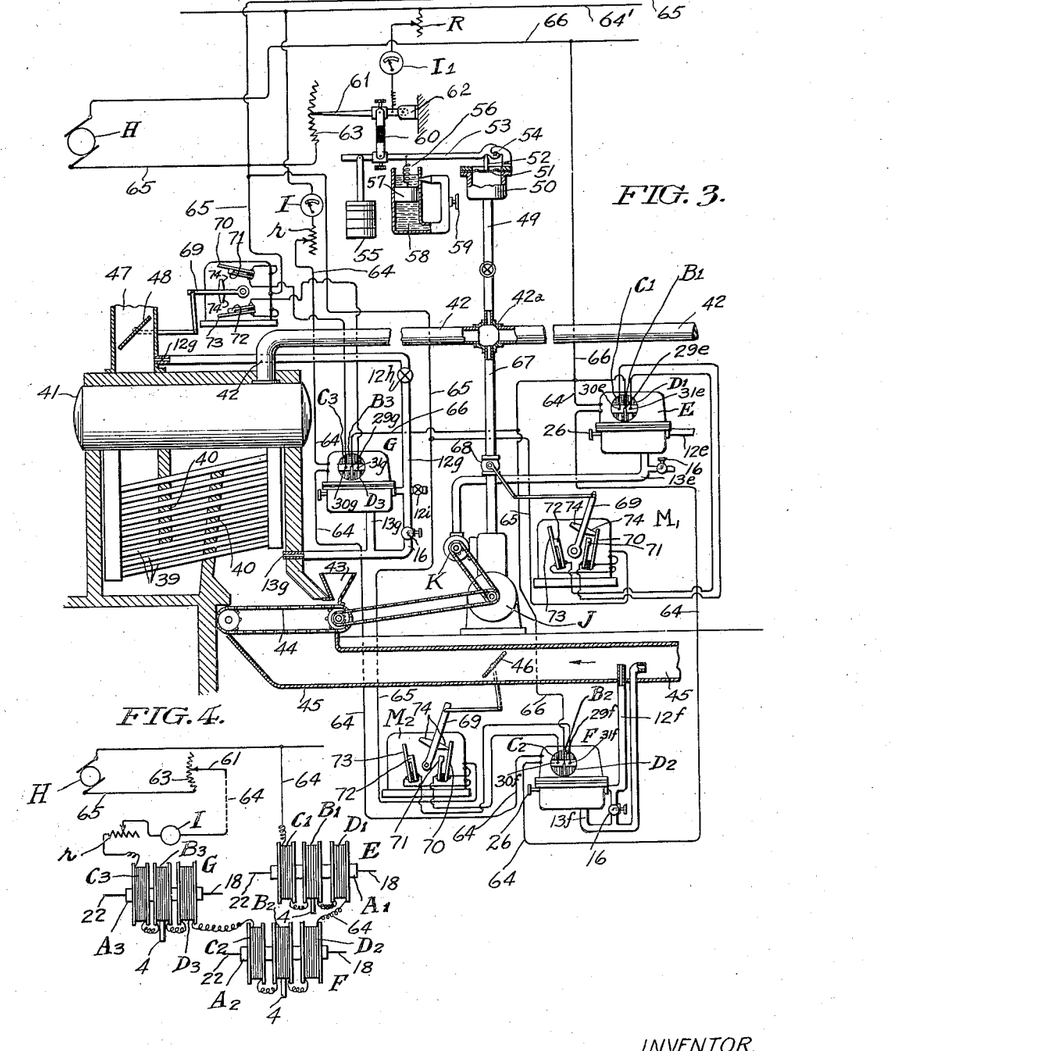
Fig. 3 is a view, partly in section, partly in elevation, and in part diagrammatic, of a system of control embodying my invention.
Fig. 4 is a diagrammatic view of one of the circuits utilized in a system in accordance with Fig. 3.

For illustration of a system of control embodying my invention, and as one of numerous examples of modes of applying the control balance embodying my invention, reference is had to Fig. 3, illustrating a group of controls for a boiler or steam generator for effecting maintenance of substantially predetermined standard steam pressure notwithstanding wide fluctuations in load upon a plant.

The steam generator may be of any suitable type, and in the example illustrated, comprises the water tubes 39, associated with suitable baffle walls 40 for directing the hot gases in a circuitous path, and communicating with the drum 41, from which steam is discharged through the pipe 42. Fuel is delivered into the chute or hopper 43 on to the travelling grate or stoker structure 44, air being delivered through the duct 45, as from a blower, under control of the damper 46, to the under side of the grate and through the fuel bed thereon for supporting combustion, the hot gases passing upwardly around the tubes 39, downwardly between the walls 40 and upwardly to the breeching, stack or chimney 47 controlled by the damper 48.

The pressure of the steam delivered through the pipe 42 is communicated through the pipe 49 to the chamber 50, one of whose walls is a flexible diaphragm 51 acting through the post 52 upon the lever 53 fulcrumed upon the knife edge 54 and having the attached biasing weight 55. Attached to the lever 53 at a desired point is an elastic member, preferably a helical spring 56, to which is attached a weighted plunger 57 movable within a cylinder 58 containing a fluid, preferably a liquid as glycerine. The rate of fluid transfer from one side of the plunger or piston to the other is controllable, as for example, by a by-pass connection having an orifice varied by adjustment of a throttle valve 59.

Normally the system comprising the lever 53, diaphragm 51, biasing weight 55 and weighted plunger 57 with the connecting spring 56 is in equilibrium. Upon change of pressure within chamber 50 lever arm 53 immediately moves to position such that change of tension of spring 56 balances the pressure variation. Subsequently in a period of time determined by adjustment of valve 59 the plunger 57 moves to a position restoring tension of spring 56 to original value and during this movement arm 53 moves cumulatively to initial response resulting in relatively slight over-adjustment of arm 53. With greater instantaneous departure of pressure within chamber 50 from standard, the tension of the spring is increased correspondingly with resultant more rapid movement of plunger 57 and therefore increased rate of pressure restoration.

A link member 60 transmits movement of lever 53 to contact arm 61 pivoted at 62 to a fixed support and coacting with resistance 63 to vary, in response to changes of steam pressure operative upon underside of diaphragm 51 and to variation of tension of spring 56, the magnitude of the control current supplied by a preferably substantially constant potential source, as generator H, to the control circuit comprising the conductor 64 connected on one hand, through the manually adjustable resistance $r$ to the feeder conductor 64', thence through the manually adjustable, master control resistance R, to automatically adjustable resistance 63 connected to line conductor 65, and on the other hand, with line conductor 66.

The pressure within chamber 50 is dependent upon at least three different factors; i. e., boiler pressure, pressure drop between the boiler and point of attachment of pipe 49, and velocity head of steam flowing through pipe 42, the last two factors being definite functions of rate of flow of steam through pipe 42. Since the velocity head is ordinarily a negligible factor with the pipe 49 connected to 42 adjacent a boiler drum 41, the pressure within chamber 50 closely approximates that of the boiler whereas, with pipe 49 connected to steam main 42a at a point between which and the boiler there exists considerable pipe line resistance, the pressure within chamber 50 is very largely, or to a considerable extent, affected by changes in pressure drop through the discharge pipe 42. In the latter case, with the pipe line resistance commonly encountered in boiler plant practice, the pressure drop due to rate of flow, is the controlling or dominant factor so that pressure changes in boiler plant header are closely related to variation in steam flow.

At E, F and G are indicated control balances of any suitable character, and preferably of the character illustrated in Fig. 1. As indicated in Fig. 4, the control circuit includes in series with each other the fixed and movable control coils B1, C1, D1 of the auxiliary controller or control balance E, the fixed and movable control coils B2, C2, D2 of the auxiliary controller or control balance F, and the fixed and movable control coils B3, C3 and D3 of the auxiliary controller or control balance G, and, when suitable or desirable, the ammeter, recording ammeter or integrating current meter I. The control coils are similar to the control coils B, C and D, as described in connection with Fig. 1, and in each of the auxiliary controller or control balances are provided in association with the control coils the movable cores A1, A2 and A3, adjustable as and for the purpose described in connection with Fig. 1.

The stoker or means for delivering fuel to the furnace of the steam generator is driven by any suitable motor, as, for example, the steam engine J, supplied with steam from any suitable source, for example, the pipe 42, through the pipe 67 controlled by the valve 68, in turn controlled by a reversible electric motor M1, similar to the motor M of Fig. 2, preferably through suitable reduction gearing, not shown, which drives the oscillatory lever 69, connected through suitable elements to the movable member of the valve 68. The movable contact 29e of the control balance E is connected with the conductor 66, while the stationary contacts 30e and 31e connect to the series field windings of the motor M1, whose armature connects with the conductor 65. A movable contact 70 and a fixed contact 71 constitute a limit switch in the field circuit controlled by contact 30e; and similar contacts 72, 73 constitute a limit switch in the field circuit controlled by contact 31e. The lever 69 carries the members 74, which are adapted to engage the movable contacts 70 and 73 at the limits of travel in opposite directions to break the motor circuit.

The engine J drives an air blower K which effects, through pipe 13e, corresponding with pipe 13 of Fig. 1, within the bell on the balance arm of the controller E a pressure dependent upon the speed of the stoker 44. The space above the liquid in the controller E communicates with the atmosphere through the pipe 12e, whereby there is effected a differential pressure acting upon the tilting balance arm, the effective pressure being adjustable, if suitable or desirable, as by connecting the pipe 13e to atmosphere through a needle valve, such, for example, as 16 of Fig. 1.

The damper 46 in the air supplying duct 45 is actuated by the reversible motor M2 which, preferably through reduction gearing, not shown, moves the lever 69, operatively connected to the damper 46, in opposite directions, the lever 69 controlling the limit switches, as described in connection with the motor M1. The movable contact 29f, of the control balance F, connects with the conductor 66, while the stationary contacts 30f and 31f connect with the series field windings of the motor M2.

The tube 12f extends into the air duct 45 and connects with the chamber of the control balance F and the pipe 13f communicates with the interior of the bell of the balance F and terminates within the duct 45 at an extension facing the direction of the air current, whereby the differential pressure representing the rate of flow of air is exerted upon the balance arm of the controller F, the operation of the damper 46 being in general similar to the operation of the valve 68, the damper 46 being brought to such position that the effect of the control current is balanced by the effect of the differential pressure, and when there is an unbalance, the motor M2 rotates in such direction to move the damper 46 in such direction as to restore a balance. A needle valve 16, or equivalent, may form a bleeder connection between the tubes 12f and 13f, as explained in connection with Fig. 2.

The damper 48 in the breeching, stack or chimney 47 is similarly actuated by the reversible motor M3, provided with limit switches and controlled by the control balance G, whose movable contact 29g connects with the conductor 66 and whose stationary contacts 30g and 31g connect with the series field windings of the motor M3.

The pipe 12g communicates with the breeching or stack 47, and the pipe 13g communicates with the fire box above the fuel bed. As the magnitude of the control current through the fixed and movable coils of the controller G varies, the damper 48 will be correspondingly varied in position to effect such differential pressure as between the fire box and stack to effect a rebalancing of the controller G. The pipes 12g and 13g may be connected by a bleeder pipe, controlled by a needle valve 16 or the like, as explained in connection with Fig. 2. Furthermore, the pipe 12g, in lieu of connecting with the stack 47, may open to atmosphere, as by closing valve 12h and opening valve 12i to atmosphere; and in this latter case the control is effected according to difference between overfire and atmospheric pressure; the bleeder effect may be attained by simply bleeding the pipe 13g directly to atmosphere through a needle valve or the like.

The operation of the system indicated in Fig. 3 is as follows:

The pressure of the steam delivered through the pipe 42 from the boiler is permitted to fall temporarily through a suitably small range, as of the order of twenty pounds per square inch, with increase of load from minimum to maximum, the magnitude of the control current changing inversely with and in definite relation to the change of steam pressure.

Accordingly, as the steam pressure falls with increase of load, the magnitude of the control current increases by a corresponding predetermined amount, with the result that, for a given position of the core A1 of the control coils of the control balance E, the force exerted by the control current upon the balance mechanism increases, throwing the movable system of the balance E out of balance, causing energization of the motor M1, which rotates in such direction as to actuate the valve 68 in such direction as to further open it and allow delivery of more steam to the engine J, which increases in speed, increasing the rate of delivery of coal or other fuel from the hopper 43 into the fire chamber, the controller F simultaneously causing energization of the motor M2 to actuate the damper 46 in the air duct 45 in such direction as to cause or allow delivery of air to the fuel or fire box at a correspondingly increased rate, the effect of increase of supply of fuel and air effecting a greater rate of combustion and a greater rate of steam production. With increased speed of the engine J and greater rate of flow of air through the duct 45, the differential pressures exerted in the controllers E and F increase until balance is restored and the motors M1 and M2 deenergized.

The increase in magnitude of the control current through the fixed and movable coils of the controller G unbalances it, causing energization of the motor M3, which rotates in such direction as to move the damper 48 further toward open position until increased differential pressure ultimately balances the force exerted by the control coils, in which case the motor M3 is deenergized with the damper 48 wider open and in a position suited to the increased rate of combustion.

In accordance with my invention, as thus far described, therefore, the magnitude of change of the control current is definitely related to the magnitude of change of steam pressure, the current increasing with decrease of steam pressure, and vice versa. The mechanism which effects a change in magnitude of the control current to accord with change in steam pressure may be considered a master controller which effects a control of the auxiliary controllers E, F and G, as described.

It is generally desirable that the pressure in the header be maintained substantially constant. The provision of the dash pot having the weighted plunger 57 affixed at one end of spring 56 causes the tension of the spring to resume a standard value after an interval restoring the pressure to a standard value irrespective of the position of the contact arm 61 and therefore value of the control current. The adjustment of the time element of the dash pot effects adjustment of the rate of pressure-restoration action. With the lower end of spring 56 attached to a fixed support as in a modification of my invention hereinafter described instead of to plunger 57 or its equivalent, the pressure is not restored to a standard magnitude, but attains a new value corresponding to the changed value of control current since the spring tension remains changed for a change in position of arm 53.

The rate of delivery of fuel as controlled by the auxiliary controller E is proportional to the magnitude of the control current, the differential pressure in the controller E being proportional to the square of the speed of the blower K, and therefore of the speed of the engine J and of the stoker mechanism, and the force exerted by the control current is proportional to the square of the current, whereby the speed of the engine J and the rate of delivery of fuel by the stoker is proportional to the control current.

Similarly, as regards the controller F, the differential pressure exerted thereon is proportional to the square of the rate of flow of air through the duct 45, and the electric control force is proportional to the square of the control current, whereby the controller F functions to maintain a rate of delivery of air which is proportional to the control current.

When pipe 12g communicates with stack or breeching 47 and pipe 13g communicates with the furnace, controller G is responsive to a pressure differential that is substantially proportional to the square of the rate of flow of gases through the heat exchange structure of the boiler and the force exerted by the control current is proportional to the square of that current, whereby the controller G functions to effect such position of the damper 48 that the rate of flow of gases through the heat exchange structure is proportional to the control current.

It is generally desirable to maintain a pressure below atmospheric in the furnace above the fuel bed. Such a condition can be definitely secured by leaving pipe 12g open to the atmosphere so that controller G will operate directly to maintain a furnace suction. The pressure differential acting on the balance will then be proportional to the square of the rate of over-fire air supply, whether the latter be by infiltration through the furnace walls or by definitely provided openings. As the force exerted by the control current is proportional to the square of that current, controller G will function so to set damper 48 that the rate of over-fire air supply is proportional to the control current. Such action is desirable to secure efficient secondary combustion. To secure a slight furnace suction even at no load, a weight can be permanently placed upon arm 3 of controller G, so that a slight pressure differential will be required to balance the controller when the control current is reduced to zero.

As above described, the master controller establishes, in response to steam pressure variations, predetermined magnitudes of the control current which through the auxiliary controllers effect rates of delivery of fuel and air, and rates of discharge of gases through the stack 47, proportional to the control current, which latter is varied in direct proportion, but inversely, with changes in steam pressure. Accordingly, upon a decrease of steam pressure, the rate of supply of fuel and air and discharge of gases through the stack 47 is increased in like proportion to the decrease in steam pressure; and vice versa, with an increase of steam pressure, the auxiliary controllers effect proportionate decreases in rate of delivery of fuel and air and discharge of gases through the stack 47.

Furthermore, the ratio between magnitude of control current and the rate of flow or delivery of fuel, the rate of flow of air through the duct 45, and rate of flow of gases to or through the stack 47, may be altered or changed in magnitude by adjustment, as by disks 26, Fig. 1, to effect adjustment of the cores of the balance coils in any one or more auxiliary controllers, or by effecting an equivalent change in the relation to the actual magnitude of the force produced by the electric current to the magnitude of the current; or by the bleeder action which varies the actual magnitude of the differential pressure exerted upon any or all of the controllers; or both the bleeder action and the matter of adjustment of force exerted by the current may be resorted to.

As shown in Fig. 3, the pipe 49 may be tapped to a header or discharge pipe 42a to which two or more boiler units as above described are connected, each unit having respective auxiliary controllers E, F, and G subject to the common master controller comprising resistance 63 whereby the boiler system is controlled as a unit. The ammeter I indicates the total control current, that is, the sum of the control currents of the boiler unit branch circuits, and is representative, under stated conditions, of the system demand or load. The setting of the manually adjustable resistance R common to the several control circuits determines the largest value of control current that may flow, and this determines one limit of control. By short circuiting the resistance 63, control of the boiler system may be effected by manual variation of resistance R, the operator setting the movable contact to a suitable or desirable point corresponding with information afforded by pressure gauges or other devices.

Desired distribution of total system load between the several units may be effected manually by adjustment of their individual control current limiting resistances r, the respective ammeters I indicating the value of control current in each control circuit and under stated conditions, the load carried by the unit. Short-circuiting 63 and R, permits complete manual control of each individual control circuit by variable resistance r.

Figure 5:
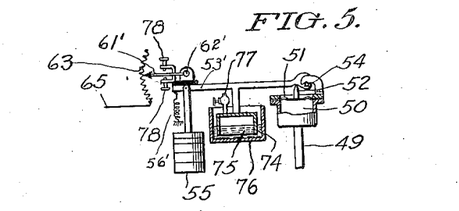
Fig. 5 is an elevational view, partly in section, of a modified construction of control mechanism.

Referring to the modification of the master control rheostat shown in Fig. 5, to the arm 53' is attached the dash pot bell or open ended chamber 74, whose mouth or lower end extends beneath the level of the liquid 75, as oil, within the stationary chamber 76. Effecting communication between the interior of bell 74 and the outer atmosphere is adjustable needle valve 77 to predetermine retarding or dash pot effect for preventing sudden or erratic movements of lever 53' or for introducing a predetermined time lag. If desired a similar device may be attached to corresponding mechanism of Fig. 3 for a similar purpose. Secured upon the lever 53' are the opposed adjustable stops 78 between which is disposed the contact arm 61', pivoted at 62' on lever 53' and coacting with resistance 63 to vary, in response to changes of the steam pressure operative upon the under side of diaphragm 51 the magnitude of the control current. A similar arrangement to permit a desired amount of lost motion may be employed in corresponding structure of Fig. 3.

The stiffness of the diaphragm 51 determines the range within which the pressure may vary with effective control, which range may be augmented by attaching a spring as helical spring 56' at one end to the lever arm 53' and at the other end to a fixed point. With either construction as distinguished from that of Fig. 3, upon change of pressure due for example to a variation of load or rate of flow, the pressure is not restored to its original or standard value but attains a new magnitude corresponding to the new value of control current at which a balance is effected. By locking the weighted plunger 57 of the corresponding mechanism of Fig. 3 at a fixed position, the same result is attained. When spring 56 or 56' is used it is not necessary to employ a stiff diaphragm.

The over-fire pressure, that is, the pressure in the region over the fuel bed upon the grate 44, or with which the pipe 13g communicates, is increased either by moving the stack damper 48 toward closed position or by increasing the underfire air blast pressure. The over-fire suction is due to the difference between the pressure in the overfire region and atmospheric pressure, and accordingly, since atmospheric pressure is substantially constant, the over-fire suction increases with decrease in over-fire pressure.

In accordance with one aspect of my invention, the combustion is controlled so as to increase the over-fire suction with change of the steam pressure from a predetermined magnitude. This control is obtainable by the auxiliary controller G, as by effecting movement of the stack damper 48 toward open position in response to decrease in the steam pressure, thereby reducing the over-fire pressure and accordingly increasing the over-fire suction.

It is to be understood that the term "over-fire" pressure is not restricted to the pressure over a fuel bed or grate but includes the pressure in any furnace chamber, as for example, in a furnace to which liquid, gaseous, or pulverized solid fuel is supplied and in which there is no fuel bed.

What I claim is:

1. In a balance structure, the combination with a deflecting arm, of means for exerting upon said arm a force representative of the magnitude of a condition, relatively fixed and movable control members exerting an opposing force upon said arm, one of said members being a coil and another of said members being means for effecting a magnetic field, and means for adjusting the force exerted by said control members per unit of control current comprising a magnetizable core member adjustable with respect to said coil.

2. In a balance structure, the combination with a deflecting arm, of means exerting upon said arm a force representative of the magnitude of a condition, relatively fixed and movable coils traversed by a control current, the movable coil attached to said arm, and means for adjusting the force exerted by said coils upon said arm per unit of control current comprising a core member adjustable with respect to at least one of said coils.

3. In a balance structure, the combination with a deflecting arm, of means exerting upon said arm a force representative of the magnitude of a condition, relatively fixed and movable coils traversed by a control current, the movable coil attached to said arm, and means for adjusting the force exerted by said coils upon said arm per unit of control current comprising a core member adjustable with respect to said coils.

4. In a balance structure, the combination with a deflecting arm, of means exerting upon said arm a force representative of the magnitude of a condition, relatively fixed and movable coils traversed by a control current, the movable coil attached to said arm, means for adjusting the force exerted by said coils upon said arm per unit of control current comprising a core member adjustable with respect to at least one of said coils, means biasing said core member toward one position, and means for adjusting said core member comprising a flexible member attached thereto, and means for moving said flexible member to a predetermined position.

5. In a balance structure, the combination with a deflecting arm, of a casing enclosing the same, means extending through said casing for applying to said arm a force representative of a magnitude of a condition, a plurality of relatively movable coils traversed by a control current, at least one of said coils secured to said deflecting arm, a core structure, a drum within said casing, means on the exterior of said casing for rotating said drum, and flexible means connected to said core structure and winding upon said drum for adjusting the position of said core structure.

6. A flow balance comprising a closed casing, a member pivoted therein, a bell carried by said member, liquid disposed in said casing and in which the mouth of said bell is submerged, fluid-pressure-transmitting means extending through said casing and communicating with the interior of said bell, a second fluid-pressure-transmitting means communicating with the interior of said casing, a coil secured to said pivoted member, a relatively fixed coil co-acting therewith, said coils traversed by a control current, core structure, a drum within said casing, means on the exterior of said casing for rotating said drum, and a cord winding on said drum and connected to said core structure for adjusting the force exerted by said coils per unit of control current.

7. A flow balance comprising a closed casing, a member pivoted therein, a bell carried by said member, liquid disposed in said casing and in which the mouth of said bell is submerged, fluid-pressure-transmitting means extending through said casing and communicating with the interior of said bell, a second fluid-pressure-transmitting means communicating with the interior of said casing, a coil secured to said pivoted member, a relatively fixed coil co-acting therewith, said coil traversed by a control current, core structure, a drum within said casing, means on the exterior of said casing for rotating said drum, a cord connected to said core structure and winding upon said drum, and means biasing said core structure for movement in a direction opposite to that effected by said drum.

8. In control apparatus, a member supported for movement to different positions, means responsive to change in conditions to which said apparatus is subjected during operation thereof and operable upon such change to impart movement to said member from its instant position of rest to a different position, means normally operable to counterbalance the operating influence of said first-named means when said member is in said instant position, said counter-balancing means placed out of counter-balancing condition by movement of said member to said different position, and means associated with said counter-balancing means and operable to provide for restoration of the same to counter-balancing condition with respect to said member while said member remains substantially in said different position.

9. In control apparatus, an element supported for movement to different positions, means providing for application to said element of a force variable in accordance with conditions to which said apparatus is subjected during operation thereof, and means providing for application to said element of a force opposite in effect to the effect of such first-mentioned force; said second-named means comprising complementary cooperating members, one of said members disposed for movement with and with respect to said element, another of said members fixed against movement both with and with respect to said element.

10. In control apparatus, a control element, and means providing for modification of controlling action of said element; said means including a cylinder member, a piston member movable in said cylinder member, and a spring connecting one of said members to said element.

11. In control apparatus, a control element, and means providing for modification of controlling action of said element; said means including a cylinder member, a piston member movable in said cylinder member, and a coil spring connecting one of said members to said element.

12. In control apparatus, a control element, and means providing for modification of controlling action of said element; said means including a cylinder member, a piston member movable in said cylinder member, and a spring supporting one of said members in cooperating relation with respect to the other.

13. In a control system, a vapor generator, and apparatus operable to control operation of said generator and including a substantially balanced control element supported for movement to different control positions, said apparatus responsive to variations in a certain operating condition of said generator and operable in accordance with such variations to impart controlling movement to said element from the instant control position thereof to a different control position and to maintain said element in said different control position, and means forming part of said apparatus and providing for application of a balancing force to said element in all control positions thereof, said means providing for increase in such force upon controlling movement of said element in one direction and decrease in such force upon controlling movement of said element in the opposite direction and restoration of such force to its balancing value upon cessation of any controlling movement of said element.

14. In a control system, a vapor generator, a member supported for movement to different positions, fluid-pressure means responsive to change in the pressure of vapor generated and operable upon such change to impart movement to said member from its instant position of rest to a different position, means normally operable to counter-balance the operating influence of said fluid-pressure means when said member is in said instant position, said counter-balancing means placed out of counter-balancing condition by movement of said member to said different position, and means associated with said counter-balancing means and operable to provide for restoration of the same to counter-balancing condition with respect to said member while said member remains substantially in said different position.

15. In a control system, a vapor generator, a control element, fluid-pressure means responsive to change in pressure of the vapor generated and operable in accordance with such change to effect controlling action of said element, and means providing for modification of controlling action of said element; said modifying means including a cylinder member, a piston member movable in said cylinder member, and a spring connecting one of said members to said element.

16. In a control system, a vapor generator, means responsive to changes in the pressure of vapor produced by said generator including deflecting structure, an electrical control system for controlling the rate of combustion of said generator including an impedance adjustable by said deflecting structure, and means for modifying the action of said structure comprising a retarding device, and a spring connecting said structure to said device.

17. In a control system, a vapor generator, means responsive to changes in the pressure of vapor produced by said generator including deflecting structure, an electrical control system for controlling the rate of combustion of said generator including an impedance adjustable by said deflecting structure, means for normally impressing a biasing force of constant magnitude upon said structure, a spring connecting said structure to said means, and a retarding means cooperating with said spring and said biasing means to vary the magnitude of said biasing force for rapid change of said pressure with gradual return of said force to its normal value.

18. In a control system, a vapor generator, means responsive to changes in the pressure of vapor produced by said generator including deflecting structure, combustion control means for said generator controlled by said deflecting structure, a weight for normally impressing a biasing force of constant magnitude upon said structure, a spring connecting said weight to said structure, and means cooperating with said weight to vary the tension of said spring upon rapid change of said pressure to vary said biasing force with gradual return of the spring tension and the biasing force to normal magnitude.

EDWARD S. BRISTOL.